US009496567B2

(12) United States Patent
Ruokomaki

(10) Patent No.: US 9,496,567 B2
(45) Date of Patent: Nov. 15, 2016

(54) METHOD AND ARRANGEMENT FOR UTILIZING RECIRCULATION FOR HIGH TEMPERATURE FUEL CELL SYSTEM

(71) Applicant: Convion Oy, Espoo (FI)

(72) Inventor: Jaakko Ruokomaki, Espoo (FI)

(73) Assignee: CONVION OY, Espoo (FI)

( * ) Notice: Subject to any disclaimer, the term of this patent is extended or adjusted under 35 U.S.C. 154(b) by 0 days.

(21) Appl. No.: 15/003,916

(22) Filed: Jan. 22, 2016

(65) Prior Publication Data

US 2016/0141653 A1 May 19, 2016

Related U.S. Application Data

(63) Continuation of application No. 14/456,824, filed on Aug. 11, 2014, which is a continuation of application No. PCT/FI2003/050118, filed on Feb. 5, 2013.

(30) Foreign Application Priority Data

Feb. 10, 2012 (FI) ..................................... 20125147

(51) Int. Cl.
*H01M 8/04089* (2016.01)
*H01M 8/0612* (2016.01)
(Continued)

(52) U.S. Cl.
CPC ..... *H01M 8/04097* (2013.01); *H01M 8/04007* (2013.01); *H01M 8/04738* (2013.01); *H01M 8/04753* (2013.01); *H01M 8/04761* (2013.01); *H01M 8/0618* (2013.01); *H01M 8/0662* (2013.01); *H01M 8/12* (2013.01);
(Continued)

(58) Field of Classification Search
None
See application file for complete search history.

(56) References Cited

U.S. PATENT DOCUMENTS

2002/0102443 A1 8/2002 Yang et al.
2005/0181247 A1 8/2005 Foger et al.
(Continued)

FOREIGN PATENT DOCUMENTS

EP 1 571 726 A1 9/2005
EP 1 770 812 A1 4/2007
(Continued)

OTHER PUBLICATIONS

International Search Report (PCT/ISA/210) mailed on May 7, 2013, by the European Patent Office as the International Searching Authority for International Application No. PCT/FI2013/050118.
(Continued)

*Primary Examiner* — Sarah A Slifka
(74) *Attorney, Agent, or Firm* — Buchanan Ingersoll & Rooney PC

(57) ABSTRACT

An arrangement utilizing recirculation for high temperature fuel cell system, each fuel cell including an anode side, a cathode side, and an electrolyte between the anode side and the cathode side, wherein the fuel cell system can perform anode side recirculation flow of reactants. The arrangement can accomplish a recycle ratio of 70% or more for the recirculation flow, feed to the recirculation a feed-in flow, which can include substantially high oxygen content, the feed-in flow being 30% or less of entire flow, perform heat exchanging to provide substantially reduced low temperature conditions in the recirculation flow, perform catalytic partial oxidation in the recirculation flow to produce a substantially high amount of hydrogen for the recirculation flow in fuel cell system start-up or shutdown situations, and exhaust 30% or less of the entire flow from the anode side recirculation.

5 Claims, 4 Drawing Sheets

108
111
e-
110
100
104
102
106

(51) Int. Cl.

| | |
|---|---|
| ***H01M 8/0662*** | (2016.01) |
| ***H01M 8/04701*** | (2016.01) |
| ***H01M 8/04*** | (2016.01) |
| ***H01M 8/06*** | (2016.01) |
| *H01M 8/12* | (2016.01) |

(52) U.S. Cl.

CPC . *H01M2008/1293* (2013.01); *H01M 2250/10* (2013.01); *Y02B 90/14* (2013.01); *Y02E 60/50* (2013.01); *Y02E 60/525* (2013.01)

(56) References Cited

U.S. PATENT DOCUMENTS

| | | | |
|---|---|---|---|
| 2005/0196652 | A1 | 9/2005 | Grieve et al. |
| 2006/0093879 | A1 | 5/2006 | Yang et al. |
| 2007/0065687 | A1 | 3/2007 | Kelly et al. |
| 2008/0292922 | A1 | 11/2008 | Fischer |
| 2011/0159386 | A1 | 6/2011 | Kaupert et al. |

FOREIGN PATENT DOCUMENTS

| | | | |
|---|---|---|---|
| EP | 1 998 398 | A2 | 12/2008 |
| JP | 11-273701 | A | 10/1999 |
| JP | 2004-047472 | A | 2/2004 |
| JP | 2005-535068 | A | 11/2005 |
| JP | 2008-146851 | A | 6/2008 |
| WO | WO 03/098728 | A1 | 11/2003 |

OTHER PUBLICATIONS

Written Opinion (PCT/ISA/237) mailed on May 7, 2013, by the European Patent Office as the International Searching Authority for International Application No. PCT/FI2013/050118.

Finnish Office Action for FI 20125147 dated Jan. 15, 2013.

Office Action (Notice of Reasons for Rejection) issued on Jan. 6, 2015, by the Japanese Patent Office in corresponding Japanese Patent Application No. 2014-555276, and an English Translation of the Office Action. (7 pages).

METHOD AND ARRANGEMENT FOR UTILIZING RECIRCULATION FOR HIGH TEMPERATURE FUEL CELL SYSTEM

RELATED APPLICATION(S)

This application is a continuation of U.S. patent application Ser. No. 14/456,824, filed on Aug. 11, 2014, which claims priority as a continuation application under 35 U.S.C. §120 to PCT/FI2013/050118, which was filed as an International Application on Feb. 5, 2013, designating the U.S., and which claims priority to Finnish Application No. 20125147 filed in Finland on Feb. 10, 2012. The entire contents of these applications are hereby incorporated by reference in their entireties.

FIELD

The present disclosure relates to a method and arrangement for utilizing recirculation for high temperature fuel cell systems.

BACKGROUND INFORMATION

Most of the energy of the world can be produced by oil, coal, natural gas or nuclear power. All these production methods have their specific issues as far as, for example, availability and friendliness to environment are concerned. As far as the environment is concerned, for example, oil and coal can cause pollution when they are combusted. The issue with nuclear power is, at least, storage of used fuel.

Because of the environmental issues, new energy sources, more environmentally friendly and, for example, having a better efficiency than the above-mentioned energy sources, have been developed.

Fuel cells, by which energy of fuel, for example biogas, can be directly converted to electricity via a chemical reaction in an environmentally friendly process, are promising future energy conversion devices.

A fuel cell, as shown FIG. 1, can include an anode side 100 and a cathode side 102 and an electrolyte material 104 between them. In solid oxide fuel cells (SOFCs) oxygen 106 can be fed to the cathode side 102 and it can be reduced to a negative oxygen ion by receiving electrons from the cathode. The negative oxygen ion goes through the electrolyte material 104 to the anode side 100 where it reacts with fuel 108 producing water and carbon dioxide ($CO_2$). Between anode 100 and cathode 102 can be an external electric circuit 111 including a load 110 for the fuel cell.

FIG. 2 shows a SOFC device, which is an example of a high temperature fuel cell device. SOFC devices can utilize as fuel for example natural gas, biogas, methanol or other compounds containing hydrocarbons. The SOFC device in FIG. 2 can include more than one, for example, plural fuel cells in stack formation 103 (SOFC stack). Each fuel cell can include anode 100 and cathode 102 structure as presented in FIG. 1. Part of the used fuel can be recirculated in feedback arrangement 109 through each anode. The SOFC device in FIG. 2 also can include fuel heat exchanger 105 and reformer 107. Several heat exchangers, for example, can be used for controlling thermal conditions at different locations in a fuel cell process. Reformer 107 is a device that converts the fuel, such as for example, natural gas to a composition suitable for fuel cells, for example to a composition containing hydrogen and methane, carbon dioxide, carbon monoxide and inert gases. In each SOFC device, a reformer is not necessary.

By using measurement means 115 (such as fuel flow meter, current meter and temperature meter) measurements can be carried out for the operation of the SOFC device. Part of the gas used at anodes 100 can be recirculated through anodes in feedback arrangement 109 and the other part of the gas is exhausted 114 from the anodes 100.

A solid oxide fuel cell (SOFC) device can be an electrochemical conversion device that produces electricity directly from oxidizing fuel. An SOFC device can include high efficiencies, long-term stability, low emissions, and cost. One issue with an SOFC device can be the high operating temperature, which results in long start up and shutdown times and mechanical and chemical compatibility issues.

Natural gases such as methane and gases containing higher carbon compounds can be used as fuels in SOFCs, which gases, however, have to be preprocessed before feeding to the fuel cells to prevent coking, for example, formation of harmful carbon compounds such as, for example coke, fly dust, tar, carbonate and carbide compounds. These different forms of carbon can be in this context called as a general term, harmful carbon compounds. Hydrocarbons can go through a thermal or catalytic decomposition in the formation of harmful carbon compounds. The produced compound can adhere to the surfaces of the fuel cell device and adsorbs on catalysts, such as nickel particles. The harmful carbon compound produced in the coking can coat some of the active surface of the fuel cell device, thus significantly deteriorating the reactivity of the fuel cell process. The harmful carbon compounds can even completely block the fuel passage.

Preventing formation of harmful carbon compounds can be important for ensuring a relatively long service life for the fuel cells. The prevention of formation of harmful carbon compounds can also save catalysts that are the substances (nickel, platinum, etc.) used in fuel cells for accelerating chemical reactions. Gas pre-processing uses water, which can be supplied to the fuel cell device. The water produced in combining the oxygen ion and the fuel, for example, the gas on the anode 100 side, can be used in the pre-processing of the gas.

The anode electrode of solid oxide fuel cell (SOFC) can contain amounts of nickel that can be vulnerable to form nickel oxide if the atmosphere is not reducing. If nickel oxide formation is severe, the morphology of electrode can be changed irreversibly causing significant loss of electrochemical activity or even break down of cells. Hence, SOFC systems purge gas, for example, safety gas, containing reductive agents (such as hydrogen diluted with inert such as nitrogen) during the start-up and shut-down in order to prevent the fuel cell's anode electrodes from oxidation. In practical systems, the amount of purge gas has to be minimized because an extensive amount of, for example pressurized gas containing hydrogen, can be expensive and problematic as space-requiring components. Purge gases are not necessarily elemental and they can be compound gases.

Processing of CPOx (Catalytic Partial Oxidation) in fuel cell systems can produce carbon monoxide (CO) and hydrogen ($H_2$). Fuel cell system start-up or shutdown operation can include sufficient steam and hydrogen production, where CO production in large amounts can be harmful. Using higher air, for example, oxygen amounts for more complete oxidation can produce too much heat making temperature raise excessive in the start-up situation or cooling process too slow in the shutdown situation.

CPOx (Catalytic Partial Oxidation) can produce carbon monoxide (CO) and hydrogen ($H_2$). This gas mixture can be used for various chemical industry purposes, and the operating temperature of CPOx can be above 700° C. The known product gas product can be unsuitable for fuel cells due to coke formation in the system heating/operating temperatures. Start-up or shutdown gas can include sufficient steam and hydrogen production, whereas CO production in larger amounts can be harmful. Using higher air, for example, oxygen amounts for more complete oxidation, can produce too much heat making the temperature raise excessive in regards to normal SOFC operating conditions, thermal management, thermal stresses and material selection.

U.S. Patent Publication No. 2011/159386 A1 discloses a process for starting up a fuel cell system, which has a fuel cell with a cathode side and an anode side, a reformer and an auxiliary burner. Fuel cell air can be preheated with the auxiliary burner and fed to the cathode side of the fuel cell. Residual gas is circulated from the anode side of the fuel cell to the reformer and from the reformer to the anode side. Air fed to the anode side is stopped in order to remove oxygen from the anode side recirculation.

U.S. Patent Publication No 2006/093879 A1 discloses a procedure for starting up a fuel cell system having an anode exhaust recycle loop. The fuel cell system can be disconnected from its primary load and has air in both its cathode side and anode side. Gas from recirculation of the anode side flow is exhausted and only a small limited flow of fuel is provided into the anode side recirculation. Hydrogen and oxygen in the fuel and air mixture can be catalytically reacted as they recirculate in the anode side until substantially no oxygen remains in the recycle loop, and then the fuel flow rate into the anode side flow can be increased to normal operating levels and thereafter connecting the primary load across the cell.

U.S. Patent Publication No. 2006/093879 A1 discloses a reforming stage of the fuel cell system, wherein oxygen is removed from the anode side. Hydrogen and water steam can be fed to the anode side instead of production of them.

U.S. Patent Publication No. 2002/102443 A1 discloses a procedure for shutting down a fuel cell system having an anode exhaust recycle loop. A portion of the anode side flow exhaust is recirculated through the anode side in a recycle loop during operation. The fuel cell system is shut down by disconnecting the primary load from the external circuit and thereafter stopping the flow of fresh hydrogen containing fuel into the anode side flow and catalytically reacting hydrogen in the anode side recirculation by recirculating such gases within the anode recycle loop into contact with a catalyst until substantially all the hydrogen is removed.

U.S. Patent Publication No. 2002/102443 A1 discloses a similar but reversed method to that presented in U.S. Patent Publication No. 2006/093879 A1.

EP 1571726 A1 and EP 1998398 A2 disclose known systems.

SUMMARY

An arrangement utilizing recirculation for a high temperature fuel cell system is disclosed, each fuel cell in the fuel cell system having an anode side, a cathode side, and an electrolyte between the anode side and the cathode side, the arrangement comprising: means for performing anode side recirculation flow of reactants; means for accomplishing a recycle ratio of about 70% or more for a recirculation flow volume; means for feeding to the recirculation flow a feed-in flow, which includes an oxygen content, the feed-in flow being about 30% or less of an entire flow volume; means for performing heat exchanging to reduce temperature conditions in the recirculation flow; means for performing catalytic partial oxidation in the recirculation flow to produce an amount of hydrogen for the recirculation flow in fuel cell system start-up or shutdown situations; and means for exhausting about 30% or less of the entire flow volume from the anode side recirculation, the means for performing anode side recirculation and the means for accomplishing the recycle ratio being arranged to provide an inlet temperature of about 350° C. to 500° C. to the means for performing catalytic partial oxidation, and wherein an outlet temperature of the means for performing catalytic partial oxidation will not exceed about 800° C.

An arrangement utilizing recirculation for a high temperature fuel cell system is disclosed, each fuel cell in the fuel cell system having an anode side, a cathode side, and an electrolyte between the anode side and the cathode side, the fuel cell system comprising: a feedback arrangement for performing anode side recirculation flow of reactants; an anode recycle blower for accomplishing a recycle ratio of about 70% or more for a recirculation flow volume; a first pipe arrangement for feeding to the recirculation flow, a feed-in flow having an oxygen content, the feed-in flow being about 30% or less of an entire flow volume; a heat exchanger for performing heat exchanging to reduce temperature conditions in the recirculation flow; a reformer for performing catalytic partial oxidation in the recirculation flow to produce an high amount of hydrogen for the recirculation flow in fuel cell system start-up or shutdown situations; and a second pipe arrangement for exhausting about 30% or less of the entire flow volume from the anode side recirculation, and wherein the feedback arrangement and the anode recycle blower are configured to provide an inlet temperature of about 350° C. to 500° C. to the reformer and an outlet temperature of the reformer which does not exceed about 800° C.

A method utilizing recirculation for a high temperature fuel cell system is disclosed, which method performs anode side recirculation flow of reactants, and accomplishes a recycle ratio about 70% or more for a recirculation flow volume, the method comprising: feeding to the recirculation flow volume a feed-in flow, which includes an oxygen content, the feed-in flow being about 30% or less of an entire flow volume; performing heat exchanging to provide substantially reduced temperature conditions in the recirculation flow; performing catalytic partial oxidation in the recirculation flow to produce an amount of hydrogen for the recirculation flow in fuel cell system during start-up or shutdown situations; and exhausting about 30% or less of the entire flow volume from the anode side recirculation, wherein the heat exchanging provides an inlet temperature of about 350° C. to about 500° C. to the catalytic partial oxidation and an outlet temperature which does not exceed about 800° C.

BRIEF DESCRIPTION OF THE DRAWINGS

The subject matter of the disclosure will be explained in more detail in the following text with reference to exemplary embodiments, which are illustrated in the attached drawings, in which.

DETAILED DESCRIPTION

Figure 1:
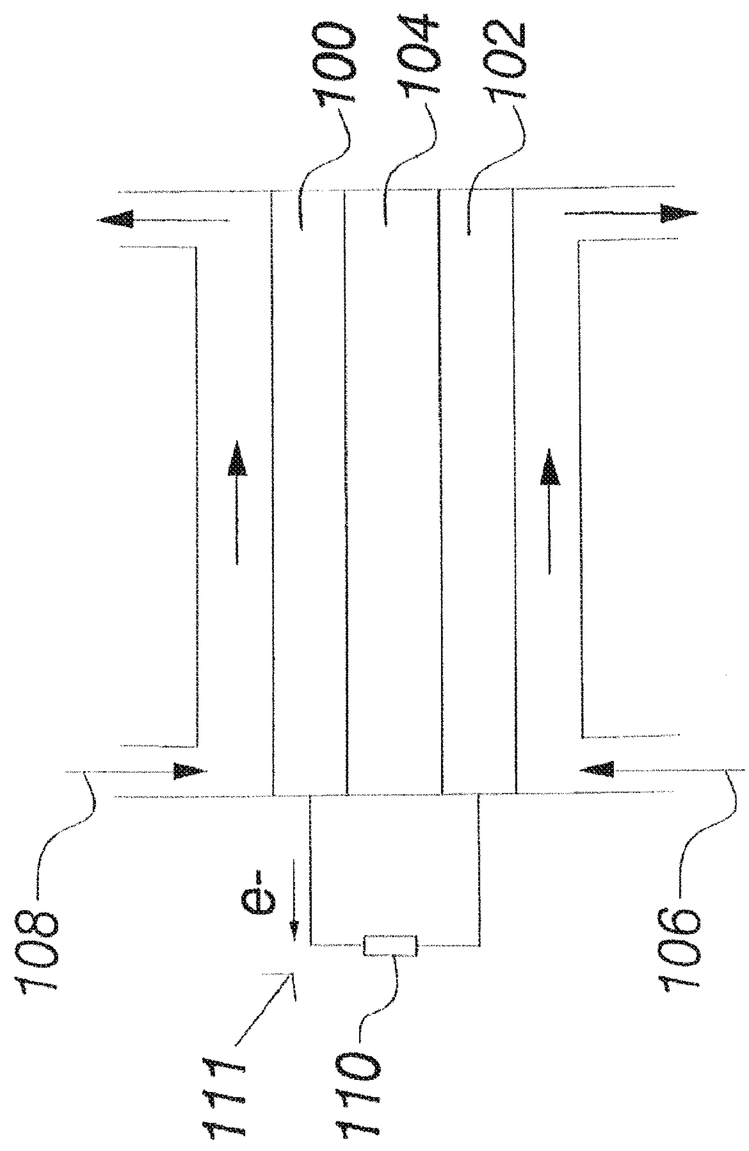
FIG. 1 shows a single fuel cell structure.

In accordance with an exemplary embodiment, a fuel cell system is disclosed, wherein the use of purge gas and external water connections can be minimized or even completely neglected in start-up and shutdown situations of a fuel cell system. In accordance with an exemplary embodiment, an arrangement utilizing recirculation for high temperature fuel cell system, each fuel cell in the fuel cell system including an anode side, a cathode side, and an electrolyte between the anode side and the cathode side, and the fuel cell system can include means for performing anode side recirculation flow of reactants. The arrangement can include means for accomplishing a recycle ratio of, for example, 70% or more for the recirculation flow, means for feeding to the recirculation a feed-in flow, which can include high oxygen content, the feed-in flow being , for example, 30% or less of entire flow, means for performing heat exchanging to provide substantially low temperature conditions in the recirculation flow, means for performing catalytic partial oxidation in the recirculation flow to produce a substantially high amount of hydrogen for the recirculation flow in fuel cell system start-up or shutdown situations, and means for exhausting, for example, 30% or less of the entire flow from the anode side recirculation the means for performing heat exchanging and accomplishing recycle ratio being arranged to provide inlet temperature of, for example, 350° C.-500° C. to the means for performing catalytic partial oxidation while outlet temperature of said means not exceeding, for example, 800° C.

A method is disclosed for utilizing recirculation for high temperature fuel cell system, in which method can perform anode side recirculation flow of reactants. In accordance with an exemplary embodiment, the method can accomplish an exemplary recycle ratio of 70% or more for the recirculation flow, is fed to the recirculation a feed-in flow, which can include high oxygen content, and the feed-in flow being, for example, 30% or less of entire flow, is performed heat exchanging to provide substantially low temperature conditions in the recirculation flow, is performed catalytic partial oxidation in the recirculation flow to produce a substantially high amount of hydrogen for the recirculation flow in fuel cell system start-up or shutdown situations, and, for example, 30% or less of the entire flow is exhausted from the anode side recirculation, the heat exchanging providing the exemplary inlet temperature of 350° C.-500° C. to the catalytic partial oxidation while the exemplary outlet temperature is not exceeding 800° C.

In accordance with an exemplary embodiment, a high recycle ratio for the recirculation flow is disclosed, which has sufficient oxygen or air content for an oxidation level, and on performing heat exchanging to provide substantially low temperature conditions in the recirculation flow. Catalytic partial oxidation can be performed to produce a substantially high amount of at least one of hydrogen and steam for the recirculation flow and to control at least one of steam to carbon (S/C) and oxygen to carbon (O/C) relationship conditions in fuel cell system start-up or shutdown situations.

In accordance with an exemplary embodiment, start-ups and shutdowns of the fuel cell system can be performed without any external purge gases, which can bring cost and space savings and installation benefits.

Solid oxide fuel cells (SOFCs) can have multiple geometries. The planar geometry as shown in FIG. 1 is a sandwich type geometry employed by known types of fuel cells, where the electrolyte 104 can be sandwiched in between the electrodes, anode 100 and cathode 102. SOFCs can be made in tubular geometries where for example either air or fuel is passed through the inside of the tube and the other gas is passed along the outside of the tube. This can be also arranged so that the gas used as fuel is passed through the inside of the tube and air is passed along the outside of the tube. Other geometries of SOFCs can include modified planar cells (MPC or MPSOFC), where a wave-like structure can replace the traditional flat configuration of the planar cell. Such designs can be promising, because they share both planar cells (low resistance) and tubular cells.

The ceramics used in SOFCs do not become ionically active until they reach a very high temperature and because of this the stacks can be heated at temperatures ranging from, for example, 600° C. to 1,000° C. Reduction of oxygen 106 (FIG. 1) into oxygen ions can occur at the cathode 102. These ions can then be transferred through the solid oxide electrolyte 104 to the anode 100 where they can electrochemically oxidize the gas used as fuel 108. In this reaction, water and carbon dioxide by products can be given off as well as two electrons. These electrons then flow through an external circuit 111 where they can be utilized. The cycle then repeats as those electrons enter the cathode material 102 again.

Figure 2:
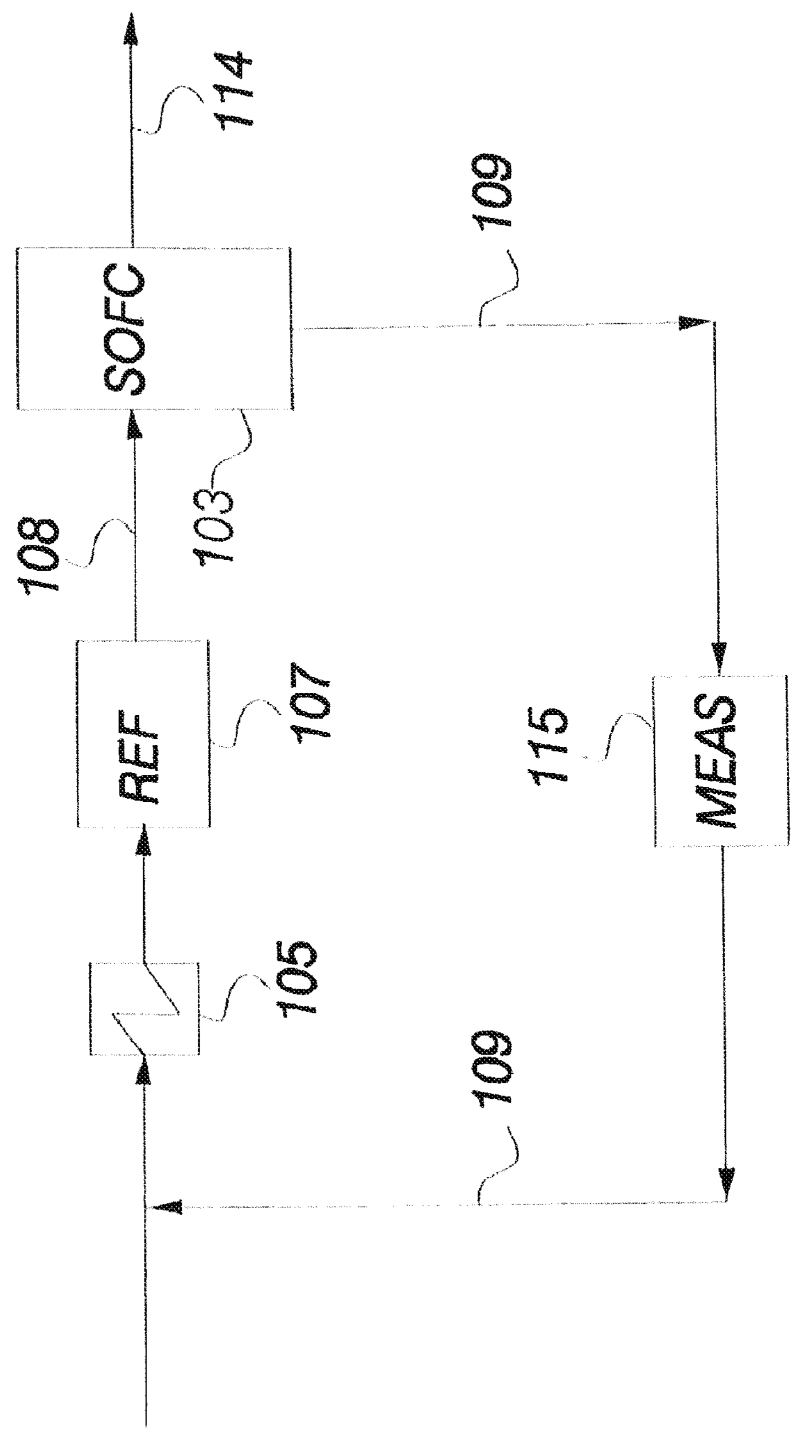
FIG. 2 shows an example of a SOFC device.

In solid oxide fuel cell systems, fuels can be natural gas (mainly methane), different biogases (mainly nitrogen and/or carbon dioxide diluted methane), and other higher hydrocarbon containing fuels, including alcohols. Methane and higher hydrocarbons are reformed either in the reformer 107 (FIG. 2) before entering the fuel cell stacks 103 or (partially) internally within the stacks 103. The reforming reactions use a certain amount of water, and additional water can also be used to prevent possible carbon formation, for example, coking caused by higher hydrocarbons. This water can be provided internally by circulating the anode gas exhaust flow, because water can be produced in excess amounts in fuel cell reactions, and/or said water can be provided with an auxiliary water feed, for example direct fresh water feed or circulation of exhaust condensate. By an anode recirculation arrangement also part of the unused fuel and dilutants in an anode gas can be fed back to the process, whereas in an auxiliary water feed arrangement an only additive to the process is water. Because an anode electrode of a solid oxide fuel cell can comprise (e.g., consist of a porous, nickel matrix ceramic-metallic structure, which morphology can be important for cell performance, oxidation of nickel can change the fuel cells performance irreversibly, which is why SOFC systems use purge gas, for example, safety gas containing reductive agents, such as hydrogen diluted with inert such as nitrogen, in order to help prevent anode electrodes of the fuel cell system from oxidation. In fuel cell systems, it may be uneconomical to maintain an excessive purge gas storage, for example, the amount of purge gas should be minimized. A pressurization arrangement, which can be provided for the use of purge gas, can have an effect on the physical size of the fuel cell system.

In accordance with an exemplary embodiment, a method is disclosed, which can utilize catalytic partial oxidation (CPOx) to provide a high recycle ratio (RR), for example 90%, in a fuel cell system by using, for example, an anode recycle blower. The anode recycle blower can enable a gas compound, which will contain the heat from said catalytic partial oxidation. Thus, fuel feed inlet composition with high oxygen content, for example, high lambda can be feasible (lambda 0.6-0.75, where lambda 1 is complete stoichiometric combustion), which would in known systems mean CPOx outlet temperatures above, for example, 1600-1800° C. The method according to the disclosure, the high RR with high lambda can be utilized to provide sufficient quality gas for all start-up specification (requirements), while not exceeding, for example, 800° C. outlet temperature. In the catalytic partial oxidation (CPOx) according to the disclosure, the released heat will be handled with high anode recycling ratio (RR), which is the recirculated part of entire flow (volumetric). For example when RR=90%, then 90% of the gas will be cooled in the anode side recirculation and recycled back to the CPOx inlet. This will also ensure steam presence in the heated components upstream of CPOx, which inhibits carbon formation in for example heat exchangers. CPOx inlet temperature can be, for example, around 450° C. CPOx can be performed in a catalyst or in a reformer.

Figure 3:
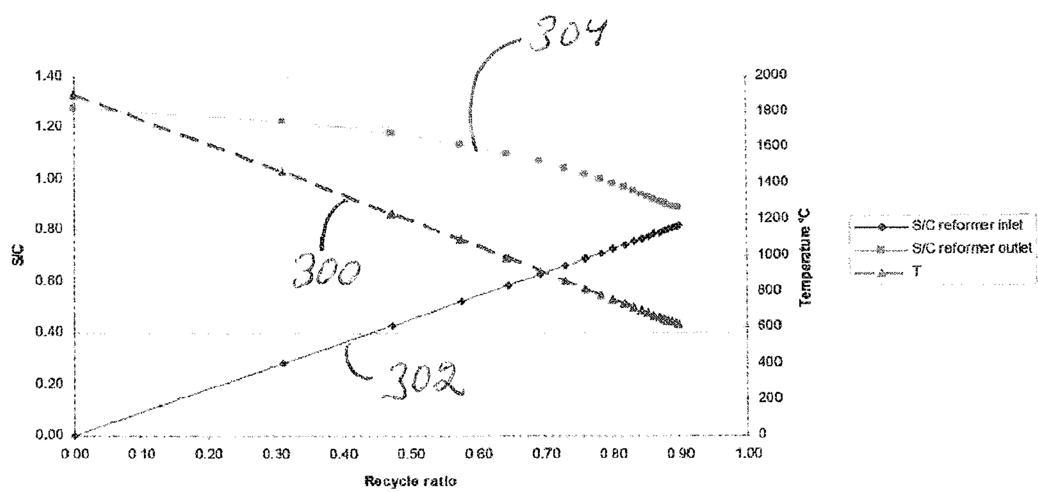
FIG. 3 shows temperature values at CPOx outlet and inlet and outlet S/C (steam to carbon-ratio) values with different recycling ratios in accordance with an exemplary embodiment.

FIG. 3 shows temperature values 301 at CPOx outlet and inlet 302 and outlet 304 steam to carbon-ratio (S/C) values with different recycle ratios. As shown in FIG. 3, it can be seen that with an inlet gas mix without anode side recirculation, the outlet temperature would rise approximately at, for example, 1900° C. In accordance with an exemplary embodiment according to the disclosure, the target temperature value at CPOx outlet can be less than 700° C. due to material selections in the anode side recirculation.

In accordance with an exemplary embodiment, the hydrogen consumption on the stacks versus the hydrogen produced at CPOx is disclosed. If the stacks consume hydrogen, this can be handled with reducing the lambda of the feed-in gas, for example, less oxygen will be fed to the CPOx, and more hydrogen will be formed. In accordance with an exemplary embodiment, depending on the hydrogen consumption on the stacks, the air feed, for example, oxygen feed can be adjusted to prevent the hydrogen deficiency in the stacks. Although this can also mean that less steam will be formed, and this can be balanced with hydrogen oxidation at the stacks in a case that a hydrogen amount will be consumed in reactions with oxygen producing steam, and this will show as more steam from the anode side recirculation. Thus the hydrogen consumption on stacks can be an adjustable parameter. Control should take into account the steam to carbon requirement: for example, the CPOx should not reduce the inlet oxygen feed more than necessary to offset the consumption, because reducing the air feed too much would start reducing S/C of the fuel cell system, which would provoke coking.

Figure 4:
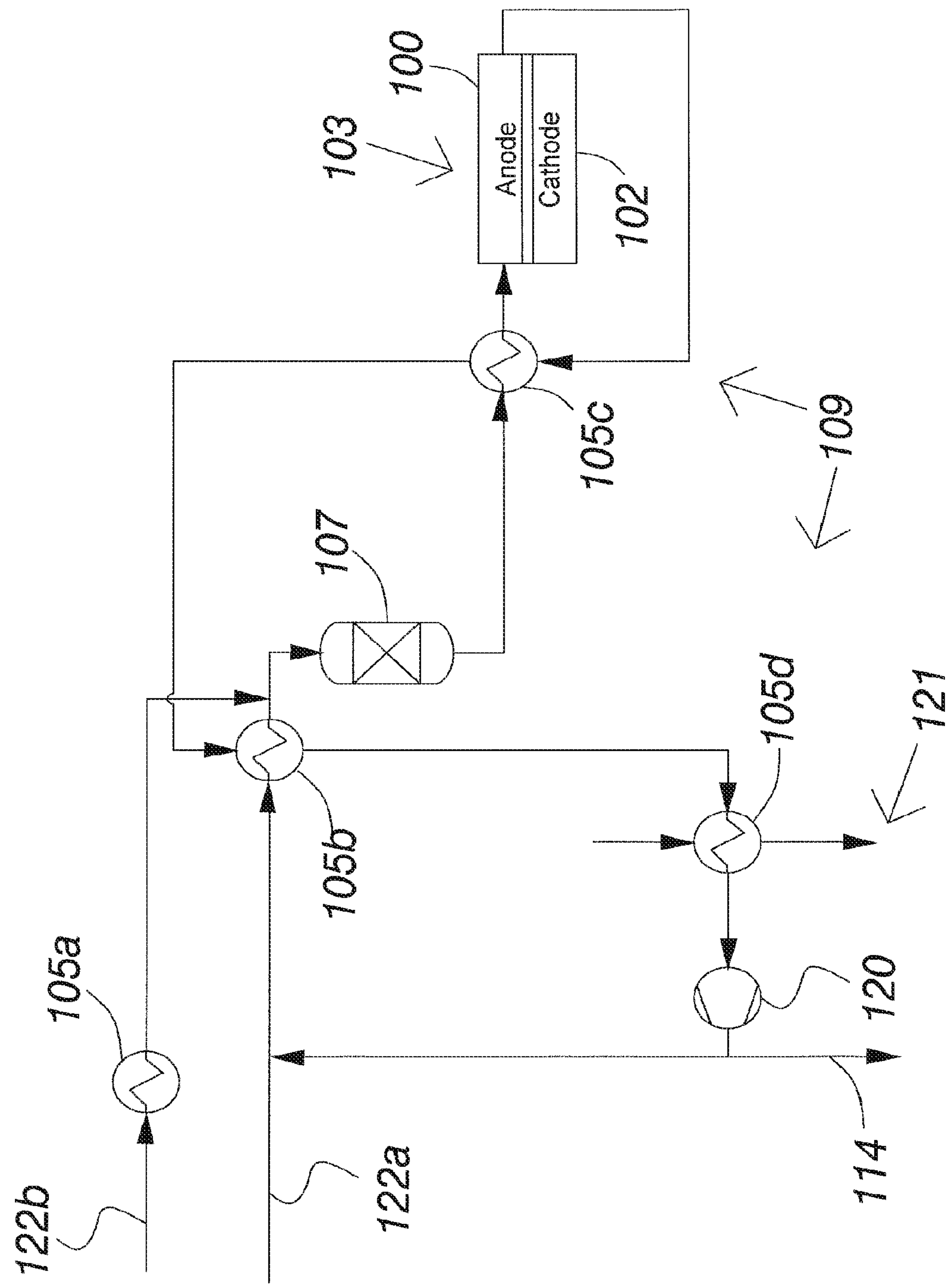
FIG. 4 presents an exemplary embodiment of an arrangement utilizing recirculation for high temperature fuel cell system.

FIG. 4 shows an exemplary arrangement according to the present disclosure, where the fuel cell system can include means 109 for performing anode 100 side recirculation flow of reactants. The means 109 can include pipes and other system parts, which can be used to arrange the recirculation. The other system parts 109 can be for example connectors and valves. The arrangement can include means 122 (*a, b*) for feeding to the recirculation a feed-in gas flow, which can include substantially high oxygen content, the feed-in flow being, for example, 30% or less of volume of entire flow. For example, the feed-in flow can be about 10% of the recirculation flow, which thus represents the 90% part of the entire flow. In an exemplary arrangement, the means 122 can include of means 122*a* and 122*b*, which are arranged by pipes and other system parts needed for the feed-in operations of air and fuel. The other system parts 122 (*a, b*) can be, for example, connectors, valves and/or controllable valves to perform controlled feed-in operations. The means 122*a* can feed in gas used as fuel, and the means 122*b* can feed in air, which can be mixed to the fuel flow and to the recirculating gas by a mixer (not shown) by connecting pipes of fuel and recirculating gas and air to the mixer or without by connecting the pipes of fuel and recirculating gas and air. The connected feed-in flows of air and fuel forms said feed-in gas flow to the recirculation. The disclosed feed-in arrangement is an exemplary one, and other feed-in arrangements can be utilized in embodiments according to the disclosure to form the feed-in gas flow, which can include high oxygen content, and the feed-in flow being, for example, 30% or less of volume of entire flow. For example, an exemplary arrangement can include means 114 for exhausting 30% or less of the entire flow from the anode side recirculation. The means 114 can be arranged by a pipe 114 and/or other system parts, such as for example connectors and/or valves.

The means 122 (*a, b*) for feeding can be arranged to feed to the recirculation a feed-in flow, which can include an exemplary lambda-value from range 0.55-0.90 indicating the high oxygen content of the feed-in flow. When needed, the lambda value can be measured by using a lambda sensor or other sensor, which can indicate the oxygen content. The arrangement can include means 120 for accomplishing an exemplary recycle ratio 70% or more for the recirculation flow. The means 120 can include an anode recycle blower 120 for accomplishing an exemplary recycle ratio RR of 80%-94%, for example RR=90%, for the recirculation flow to enable a gas compound which can contain heat from the oxidation performed by means 107 for performing catalytic partial oxidation. In an exemplary embodiment of FIG. 4, means 107 can be a catalyst 107. In accordance with an exemplary embodiment, the means 107 can be a reformer 107. The catalytic partial oxidation can be performed in the recirculation flow to produce a substantially high amount of hydrogen and steam for the recirculation flow in fuel cell system start-up or shutdown situations. For example, the means 107 can be arranged to produce content percent of 3.5%-15% of hydrogen for the recirculation flow as said substantially high amount of hydrogen. The means 107 for performing catalytic partial oxidation can also be arranged to perform catalytic partial oxidation with mixed feed-in flow and recirculation flow, so that gases in the anode side of the fuel cell system are thermodynamically outside of coking regions in normal temperature range of fuel cell system heating, cooling or operation.

In an exemplary embodiment, the arrangement of FIG. 4 can include means 105(*a, b, c, d*) for performing heat exchanging to provide substantially low temperature conditions in the recirculation flow to inhibit and/or prevent auto-ignition before the catalyst. The means 105 for performing heat exchanging, for example, arranged to provide an exemplary inlet temperature of about 350° C. to 500° C., for example, 450° C., to the means 107 for performing catalytic partial oxidation in the recirculation flow. In accordance with an exemplary embodiment, the means 105 can include, for example, of four heat exchangers 105*a*, 105*b*, 105*c*, 105*d*. The heat exchanger 105*a* can heat feed-in air by using electrical heating for example to 450° C., for example, before mixing to the fuel feed-in gas flow. The heat exchanger 105*b* can heat fuel feed-in gas flow and recirculating gas flow, for example to 450° C., before mixing to the feed-in air flow, and then the mixed gas flow of air and fuel flows to the means 107 for performing catalytic partial oxidation. The heat exchanger 105*c* can cool to some extent gas, which is flowing to the anode sides 100 of the stack(s) 103. In the start-up situation, for example, in the heating phase of the fuel cell system the stacks 103 cool the recirculating gas. Also air, which is fed to the cathode sides 102 of the stacks, can cool the recirculating gas at least when the stack module can include a radiator to enhance the heat exchanging from the recirculating gas to the air. The heat exchanger 105*d* can perform cooling 121, for example, air cooling, of the recirculating gas. For example, in this process phase, heat can be transferred out from the fuel cell system or heat can be utilized in heat integration inside the fuel cell system. The disclosed heat exchanging arrangement is an exemplary one and other variations can be utilized in embodiments according to the disclosure.

Embodiments according to the disclosure can be utilized in different kinds of start-up or shutdown situations of the fuel cell system, for example, in short time shutdowns and start-ups for service needs, etc. Embodiments of the disclosure can also be utilized for example after a short time period ESD (Emergency ShutDown) situation, after which the fuel cell system can be immediately started up back to the electricity production state, or it can be used in hot idle to keep the temperatures high with no load.

Although the disclosure has been presented in reference to the attached figures and specification, the disclosure is by no means limited to those as the disclosure is subject to variations within the scope allowed for by the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method utilizing recirculation for a high temperature fuel cell system, which method performs anode side recirculation flow of reactants, and accomplishes a recycle ratio about 70% or more for a recirculation flow volume, the method comprising:

feeding to the recirculation flow volume a feed-in flow, which includes an oxygen content, the feed-in flow being about 30% or less of an entire flow volume;

performing heat exchanging to provide substantially reduced temperature conditions in the recirculation flow;

performing catalytic partial oxidation in the recirculation flow to produce an amount of hydrogen for the recirculation flow in fuel cell system during start-up or shutdown situations; and exhausting about 30% or less of the entire flow volume from the anode side recirculation, wherein the heat exchanging provides an inlet temperature of about 350° C. to about 500° C. to the catalytic partial oxidation and an outlet temperature which does not exceed about 800° C.

2. The method in accordance with claim 1, comprising:

accomplishing a recycle ratio of 80%-94% for the recirculation flow volume using an anode recycle blower to produce a gas compound, which contains heat from the catalytic partial oxidation.

3. The method in accordance with claim 1, comprising:

feeding to the recirculation a feed-in flow, which includes a lambda-value from about 0.55 to 0.90 indicating the high oxygen content of the feed-in flow.

4. The method in accordance with claim 1, comprising:

performing the catalytic partial oxidation in the recirculation flow to produce a content percent of 3.5%-15% of hydrogen for the recirculation flow volume as a high amount of hydrogen.

5. The method in accordance with claim 1, comprising:

performing the catalytic partial oxidation with a mixed feed-in flow and recirculation flow, so that gases in an anode side of the fuel cell system are thermodynamically outside of coking regions of fuel cell system during heating, cooling or operation of the fuel cell system.

* * * * *